United States Patent [19]

Tadokoro et al.

[11] Patent Number: 4,562,805

[45] Date of Patent: * Jan. 7, 1986

[54] INTAKE SYSTEM FOR ROTARY PISTON ENGINE

[75] Inventors: Tomoo Tadokoro; Haruo Okimoto; Hideo Shiraishi, all of Hiroshima, Japan

[73] Assignee: Mazda Motor Corporation, Hiroshima, Japan

[ * ] Notice: The portion of the term of this patent subsequent to Jan. 7, 2003 has been disclaimed.

[21] Appl. No.: 556,910

[22] Filed: Dec. 1, 1983

[30] Foreign Application Priority Data

Dec. 2, 1982 [JP] Japan .................. 57-212427

[51] Int. Cl.$^4$ .......................... F02B 53/04
[52] U.S. Cl. ..................... 123/216; 123/242
[58] Field of Search ............ 123/216, 242, 52 M

[56] References Cited

U.S. PATENT DOCUMENTS 3,370,575  2/1968  Soubis ...................... 123/216
4,423,711  1/1984  Tadokoro et al. .......... 123/216 X
4,425,883  1/1984  Tadokoro et al. .......... 123/242

Primary Examiner—Michael Koczo
Attorney, Agent, or Firm—Fleit, Jacobson, Cohn & Price

[57] ABSTRACT

A two rotor type rotary piston engine includes an intake system comprised of light load intake ports provided in the intermediate housing and heavy load intake ports provided in side housings to open to the respective rotor cavities and being cyclically closed by the rotors as the rotor rotates, an intake passage including a throttle valve and individual passages leading respectively to the intake ports. The passages leading to the light load ports are communicated with each other by a communicating passage downstream of the throttle valve. The heavy load intake port includes a main port and an auxiliary port. The auxiliary port is normally closed but opened in high speed, heavy load operation by a control valve and has a closing timing later than that of the main port. The communication passage and the individual passages leading to the light load intake ports have overall length in relation to the port timings so that a compression wave produced in one individual passage in opening timing of one light load intake port is transmitted to the other light load intake port just before the other light load intake port is closed to obtain an additional charge under an engine speed in which the control valve is moved from the closed position to the open position or vice versa.

8 Claims, 5 Drawing Figures

F I G. 3
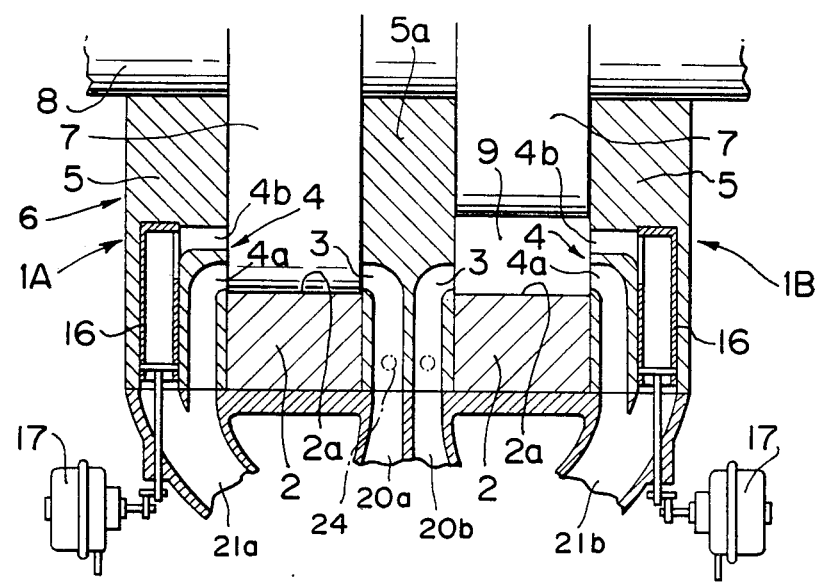

INTAKE SYSTEM FOR ROTARY PISTON ENGINE

The present invention relates to rotary piston engines, and more particularly to intake systems for rotary piston engines. More specifically, the present invention pertains to side port type intake systems for two-rotor rotary piston engines.

In general, a rotary piston engine includes a casing comprised of a rotor housing having an inner wall of trochoidal configuration, a pair of side housings secured to the opposite sides of the rotor housing to define a rotor cavity in the rotor housings. A rotor of substantially polygonal configuration is disposed in the rotor cavity and has flanks which define, with the inner wall of the rotor housing, working chambers having volumes which are cyclically changed as the rotor rotates. The rotor housing is generally formed with an exhaust port whereas the side housings are formed with intake ports so that intake, compression, combustion, expansion and exhaust cycles are conducted sequentially in each of the working chambers.

It has been already proposed to provide a rotary piston engine with a plurality of intake ports opening to a single rotor cavity. For example, in Japanese patent application No. 55-97860 filed on July 16, 1980 and disclosed for public inspection on Feb. 9, 1982 under the disclosure number 57-24419, which corresponds to the U.S. patent application Ser. No. 283,744 filed on July 15, 1981, now U.S. Pat. No. 4,423,711, there is disclosed a rotary piston engine having a primary and secondary intake ports formed in a side housing and respectively connected with a primary and secondary intake passages. The secondary intake port has a port closing timing which is later than that of the primary intake port and is provided with a control valve for opening the secondary intake port under a heavy load engine operation. Thus, the port closing timing can be changed in accordance with the engine load to provide a satisfactory intake gas charge. It should however be noted that this intake system has a problem in that there appears a discontinuity in the engine output torque curve in an engine speed range in which the control valve is opened.

In rotary piston engines, it has further been proposed to utilize pulsations in the intake passage so that effective feed of intake gas can be accomplished throughout a wide range of the engine operating speed. For example, the U.S. Pat. No. 3,491,733 issued on Jan. 27, 1970 to Soubis et al. teaches to separate the intake passage into two passages of different lengths and connect these separated passages to two separated intake ports having different port closing timings so that the two passages and the two intake ports are used under a high speed engine operation whereas only one passage and only one intake port having earlier port closing timing are used under a low speed engine operation. With this arrangement, it is possible to feed the intake charge with resonance under a wide engine operating speed.

It should however be noted that the U.S. patent relates to a single rotor type rotary piston engine and there is no precise teaching as to how the pulsations in the passages are utilized. Further, the U.S. patent discloses a so-called peripheral port type rotary piston engine having the intake ports provided in the rotor housing. This type of engine is considered disadvantageous in that the intake ports are overlapped with the exhaust port so that the exhaust gas is blown under its own pressure into the intake working chamber decreasing the intake gas charge. In engines of recent years, there is a tendency that the exhaust gas pressure is increased due to facilities for suppressing engine noise and for purifying engine exhaust gas. In engines having turbo-supercharges, the exhaust gas pressure is further increased. Therefore, the peripheral port type intake system is not satisfactory to increase the intake charge utilizing the resonance effect.

It is therefore an object of the present invention to provide an intake system for two-rotor type rotary piston engines in which pulsations in intake passages can effectively be utilized to increase the intake gas charge.

Another object of the present invention is to provide a side port type intake system for two-rotor type rotary piston engines in which pulsations in the intake passage for one rotor cavity are utilized to increase the charge in the other rotor cavity.

A further object of the present invention is to provide a side port type intake system for two-rotor type rotary piston engines which has a variable port closing timing and can effectively produce a pressure resonance effect in an engine operating speed range in which the port closing timing of the heavy load intake port is being changed.

The present invention is based on the finding that a compression wave is produced in the vicinity of the intake port when the port is opened under the influence of the pressure of the residual combustion gas and that there is a tendency in recent engines that the compression wave is intensified due to the increase in the exhaust gas pressure. Thus, according to the present invention, the compression wave produced in one intake passage leading to one rotor cavity is transmitted through the other intake passage to the intake port opening to the other rotor cavity just before the particular intake port is closed to produce a pressure resonance intake charging effect. The present invention is significant in that, in a two rotor type rotary piston engine having light load and heavy load intake ports and means for changing port closing timing of the heavy load intake ports, an arrangement is made so that the pressure resonance effect can be obtained at the light load intake ports under a speed range in which the port closing timing of the heavy load intake port is changed.

According to the present invention, there is therefore provided a two rotor type rotary piston engine including a casing comprised of a pair of rotor housings each having an inner wall of trochoidal configuration, an intermediate housing located between the rotor housings and a pair of side housings secured to outer sides of the respective rotor housings to define rotor cavities in the respective rotor housings, a pair of substantially polygonal rotors disposed in the respective rotor cavities with apex portions in sliding engagement with the inner walls of the respective rotor housings to define working chambers of cyclically variable volumes, said rotors being carried by eccentric shaft means so that said rotors are rotated with 180° phase difference in terms of angle of rotation of said eccentric shaft means, intake means including first individual intake port means provided in at least one of said intermediate and side housings to open to the respective rotor cavities and adapted to be cyclically closed by said rotors as the rotor rotates, second individual intake port means provided in at least one of said intermediate and side housings to open to the respective rotor cavities and adapted to be cyclically closed by said rotors as the rotors rotate, said second individual intake port means having means for changing port closing timing so that the port closing timing is retarded in a high engine speed range, intake passage means including throttle valve means, said intake passage means including first individual passage means leading respectively to said first intake port means and communicated with each other by first communicating passage means downstream of said throttle valve means, second individual passage means leading respectively to said second intake port means, said first intake port means and said first individual and communicating passage means having respectively a port timing and an overall length which are determined so that a compression wave produced in one of said first individual passage means in opening timing of one first intake port means is transmitted to the other first intake port means just before said other first intake port means is closed substantially at an engine speed in which the port closing timing of said second individual intake port means is changed.

In a preferable aspect of the present invention, the second individual port means includes main port means and auxiliary port means which is adapted to be closed later than the main port means, and control valve means may be associated with the auxiliary port means and adapted to be opened under a high speed engine operation. It is further preferred that the auxiliary port means has a port closing timing later than that of the first individual intake port means. The control valve means may be operated by an actuator under an engine exhaust gas pressure. In that case, there will be a transient period of several hundreds rpm in which the control valve means is partially opened. Since the pressure resonance changing effect can substantially be obtained in approximately 500 rpm range at each side of the resonance speed, the resonance speed preferably be determined within 500 rpm range at each side of the engine speed under which the control valve is opened. Usually, the control valve is shifted from the closed position to the open position at a speed between 3500 to 5000 rpm.

It is preferred that the first intake port means has an opening period of 230° to 290° in terms of angle of rotation of the eccentric shaft means and the first individual and communication passage means have an overall length of 0.31 to 1.72 m. The opening period shall be at least 230° in order to ensure sufficient amount of intake gas charge. Further, the intake port opening period shall not be greater than 290° because the first intake port means is primarily used in low and medium speed engine operation so that its closing timing shall not be later than approximately 50° after bottom dead center in order to avoid blow back of intake gas to the intake passage whereas its opening timing shall not be earlier than approximately 30° before top dead center in order to prevent the side seals from being fallen in the intake port.

It is advisable to locate the communication passage downstream of the throttle valve because otherwise the throttle valve will produce a resistance to the propagation of the compression wave. The recommendable overall length of the communication and individual passages is obtained by the formula $$L = (\theta - 180 - \theta_o) \times 60/360N \times C \quad (1)$$

where:
L is the overall length;
$\theta$ is the intake port opening period;
N is the engine speed;
C is the sonic speed;
$\theta_o$ is the inactive period which is the sum of the period between the opening timing of the intake port and generation of the compression wave, and the period required for accomplishing a satisfactory charge increase before the full close of the intake port, and this inactive period is approximately 20°.

It will thus be understood that the term $(\theta - 180 - \theta_o)$ represents the angle of rotation of the eccentric shaft corresponding to the period from generation of the compression wave at one intake port to the time at which the compression wave reaches the other intake port.

The term 60/360N represents the time period required for one revolution of the engine. Since the sonic speed C is 343 m/sec. at the ambient temperature of 20° C., the length L becomes 0.31 to 1.72 m for the engine speed N of 3500 to 5000 rpm in which the control valve is actuated in consideration of the 500 rpm range and the intake opening period of 230° to 290°. In the equation (1), the influence of the intake air flow on the propagation of the compression wave is neglected because the intake flow speed is small in relation to the sonic speec.

It should be noted that, according to the present invention, the pressure resonance charging effect can be accomplished at the engine speed under which the closing timing of the second intake port means is changed to thereby prevent a possible decrease in the engine output torque around this engine speed.

The above and other objects and features of the present invention will become apparent from the following descriptions of a preferred embodiment taking reference to the accompanying drawings, in which:

FIG. 3 is a sectional view taken substantially along the line III—III in FIG. 2;

Figure 1:
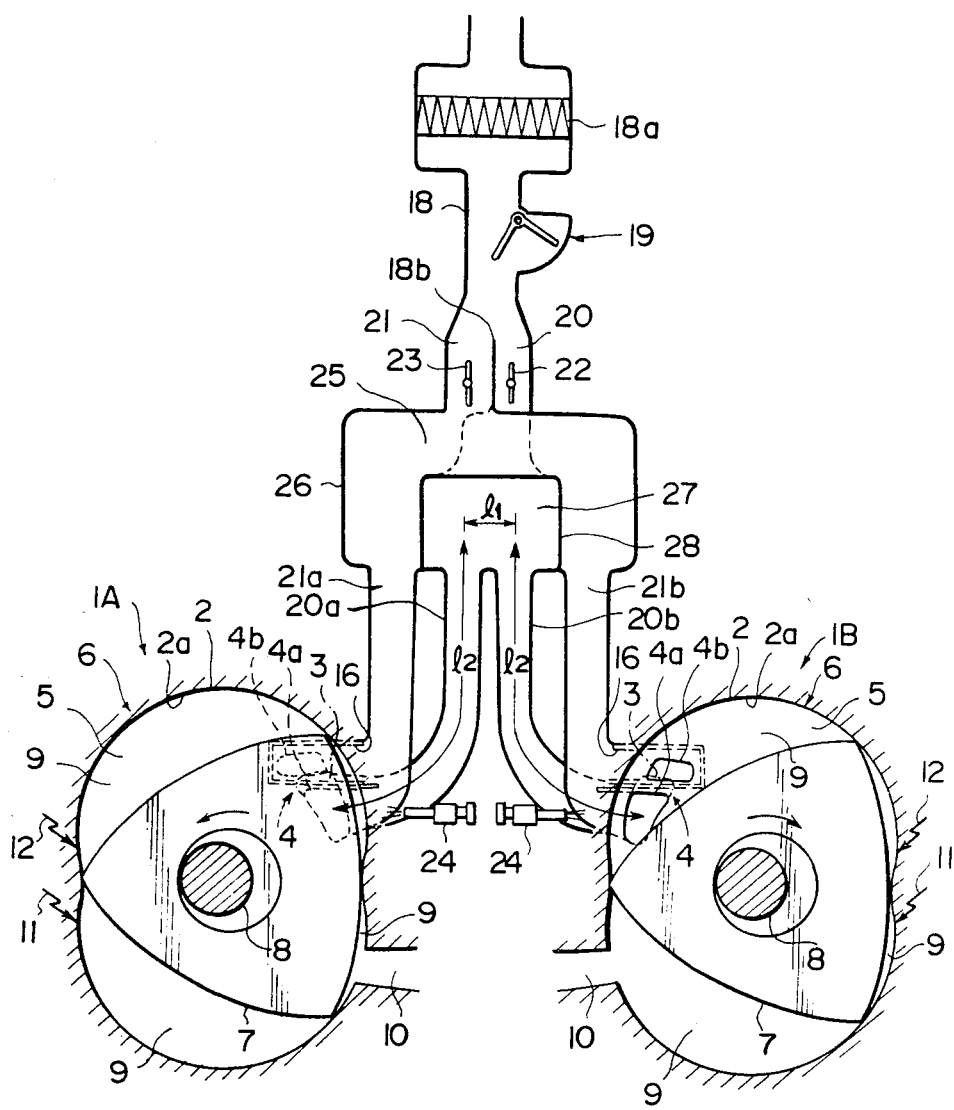
FIG. 1 is a diagrammatical sectional view of a rotary piston engine in accordance with one embodiment of the present invention.
Figure 2:
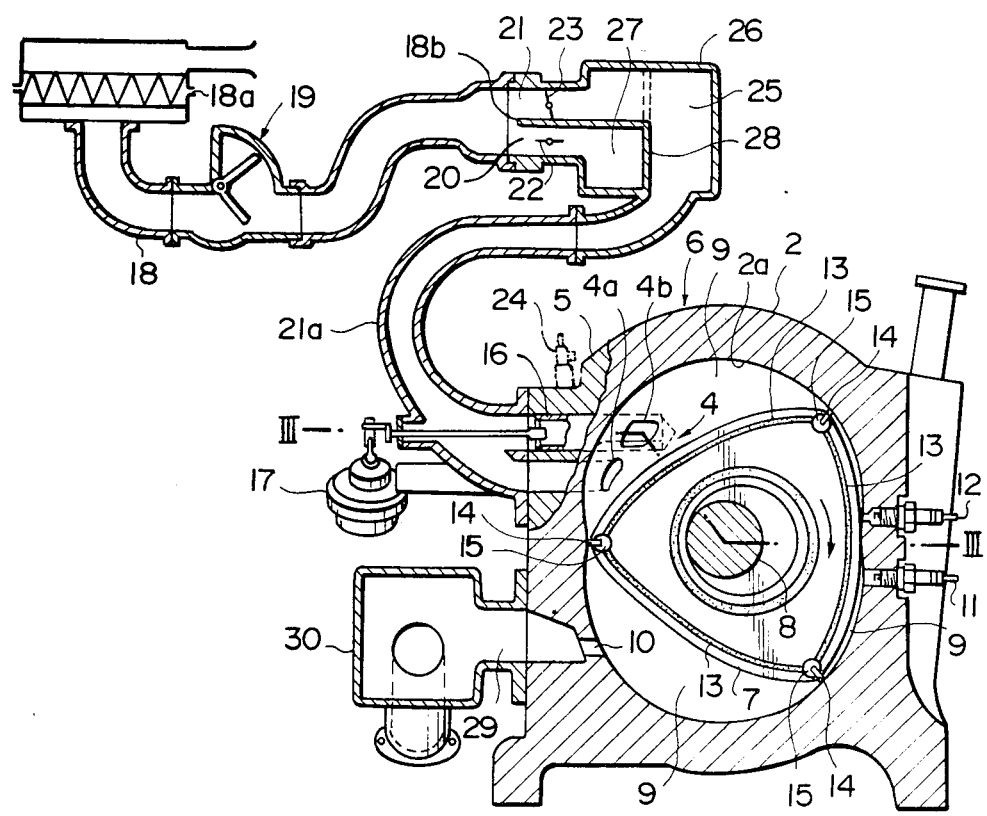
FIG. 2 is a sectional view showing the details of the intake system employed in the engine shown in FIG. 1.

Referring to the drawings, particularly to FIGS. 1 through 3, there is shown a two-rotor type rotary piston engine comprised of a pair of engine sections 1A and 1B. The engine sections 1A and 1B respectively have rotor housings 2 which are formed with inner walls 2a of trochoidal configuration. An intermediate housing 5a is located between the rotor housings 2 to separate them one from the other as shown in FIG. 3. The outer sides of the rotor housings 2 are attached with side housings 5 which are formed with heavy load intake ports 4. Thus, the rotor housings 2, the side housings 5 and the intermediate housing 5a constitute a casing 6 in which a pair of rotor cavities are defined. In the intermediate housing 5a, there are formed light load intake ports 3 respectively opening to the rotor cavities.

In each of the rotor cavities, there is disposed a rotor 7 of substantially triangular configuration. The rotors 7 are carried by an eccentric shaft 8 and have apex portions provided with apex seals 14 and corner seals 15. Further, the rotors 7 are provided at their side surfaces with side seals 13. The rotors 7 are rotatable with their apex seals 14 in sliding contact with the inner walls 2a of the rotor housings 2. The side seals 13 are maintained in sliding contact with the surfaces of the side housings 5 and the intermediate housing 5a. Thus, in each of the rotor cavities in the casing 6, there are defined working chambers 9 of which volumes cyclically change as the rotor 7 rotates. The eccentric shaft 8 carries the rotors 7 with 180° phase difference between the rotors 7. The rotor housings 2 are formed with exhaust ports 10 and provided with ignition plug 11 and 12. The exhaust port 10 is connected with an exhaust passage 29 leading to an exhaust manifold 30.

The intake system of the engine includes an air cleaner 18a connected with a common intake passage 18 provided with an air-flow detector 19. The common intake passage 18 leads to a primary intake passage 20 and a secondary intake passage 21 which are separated from each other by a partition wall 18b. The intake passage 20 is provided with a primary throttle valve 22 which is manually controlled by an engine control member to open in accordance with the engine load. The intake passage 21 is provided with a secondary throttle valve 23 which is opened when the engine control member is actuated further after the primary throttle valve 22 has been substantially fully opened. The primary intake passage 20 leads to a surge tank 28 which is in turn connected with a pair of individual intake passages 20a and 20b leading respectively to the intake ports 3 opening to the respective rotor cavities. In the vicinity of each intake port 3, the intake passage is provided with a fuel injecting nozzle 24. The surge tank 28 provides a communication passage 27 between the individual intake passages 20a and 20b.

The secondary intake passage 21 is connected with a surge tank 26 which leads to a pair of individual intake passages 21a and 21b leading respectively to the intake ports 4 opening to the respective rotor cavities. The surge tank 26 provides a communication passage 25 between the individual intake passages 21a and 21b. Each of the heavy load intake ports 4 is comprised of a main intake port 4a and an auxiliary intake port 4b. The auxiliary intake port 4b is provided with a rotary type control valve 16 which opens the auxiliary intake port 4b under a heavy load operation. For the purpose, the control valve 16 is connected with an actuator 17 which is operated by an exhaust gas pressure to open the valve 16 under a heavy engine load and when the engine speed has reached a valve operating speed which is preliminarily determined at a suitable value between 3500 to 5000 rpm.

As well known in the art, the intake ports 3 and 4 are cyclically opened by the rotors 7 and the opening period of each heavy load intake port 4 is 270° to 320° in terms of angle of rotation of the eccentric shaft 8 when the control valve 16 is opened. The light load intake port 3 has an opening period of 230° to 290°. Further, the auxiliary intake port 4b has a closing timing which is later than that of the light load intake port 3 by approximately 20° to 60° in terms of the angle of rotation of the eccentric shaft. It should further be noted that the main intake port 4a has a closing timing which is earlier than that of the auxiliary intake port 4b by more than 20°, preferably 20° to 60° in terms of angle of rotation of the eccentric shaft 8. The opening timing of the heavy load intake port 4 is the same as or earlier than that of the light load intake port 3. In FIG. 1, it will be noted that the individual intake passages 20a and 20b are located downstream the throttle valve 22 and have lengths $l_2$. Further, the openings of the individual intake passages 20a and 20b are spaced apart by a distance $l_1$ in terms of a center-to-center spacing. The surge tank 28 thus provides a communication passage 27 for the individual intake passage 20a and 20b. Since the surge tank 28 has a relatively large volume, it is possible to transmit a compression wave from one individual intake passage to the other without any significant attenuation. The overall length L of the individual intake passages 20a and 20b and the communication passage 27 is calculated by the formula $L = l_1 + 2l_2$ and this overall length is determined at a value between 0.31 and 1.72 m. Similarly, the individual passages 21a and 21b are located downstream the throttle valve 23 and the overall length of the passages 21a, 21b and 25 is determined at a value between 0.57 and 1.37 m.

Figure 4:
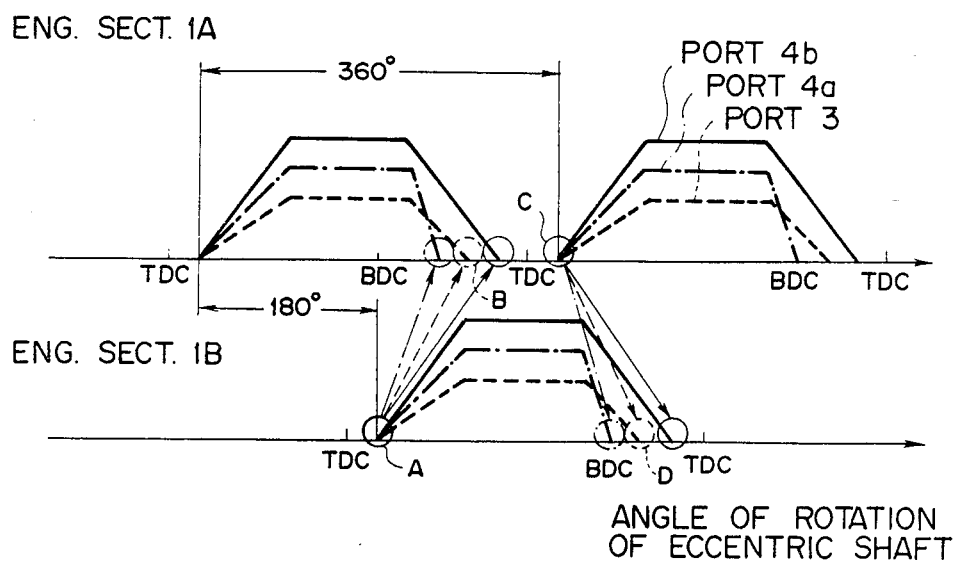
FIG. 4 is a diagram showing intake port timings in the engine shown in FIGS. 1 through 3.
Figure 5:
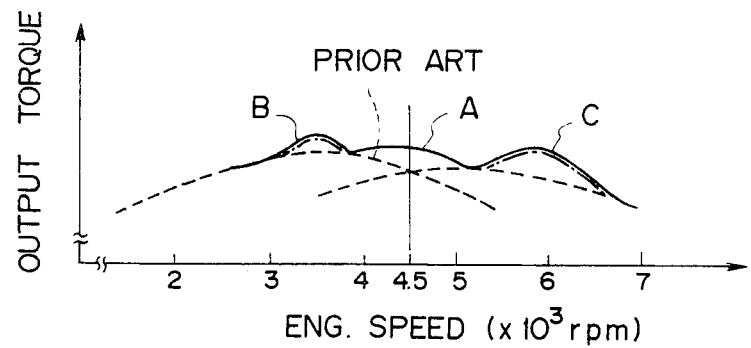
FIG. 5 is an engine output torque curve showing the improvement accomplished by the present invention.

Referring now to FIG. 4, in operation of the engine, the compression wave is produced at the intake ports 3 and 4 of one engine section, for example, the engine section 1B when the subject intake ports 3 and 4 are opened as shown at A. The compression wave produced at the light load intake port 3 is transmitted through the individual passages 20a, 20b and the communication passages 27 to the intake port 3 of the other engine section, for example, the engine section 1A. Under an engine speed in which the control valve 16 is actuated from the closed position to the open position or vice versa, since the overall length L is determined as described previously, the compression wave reaches the light load intake port 3 in the said other engine section just before the subject intake port 3 is closed as shown by B. The compression wave functions to prevent blow-back of intake gas from the intake working chamber at the final stage of the intake stroke and provide an additional charge. Similarly, the compression wave produced at the light load intake port 3 of the engine section 1A as shown by C in FIG. 4 is transmitted to the light load intake port 3 of the engine section 1B just before the intake port 3 is closed as shown by D. Thus, it is possible to obtain an increase in the engine output torque as shown by the full line curve A in FIG. 5. In the illustrated embodiment, the port timings of the main and auxiliary ports 4a and 4b of the heavy load intake port 4 and the overall length of the passages 21a, 21b and 25 are so determined that similar pressure resonance effects can be obtained at the main port 4a under a medium speed operation in which the control valve 16 is closed and at the auxiliary port 4b under a high speed operation in which the control valve 16 is opened. Thus, it is possible to obtain an engine output increase even in medium and high speed operation as shown by curves B and C in FIG. 5.

The invention is applicable not only to a fuel injection type engine but also to a carburetor type engine although the application to a fuel injection type engine is more preferable than to a carburetor type engine.

The invention has thus been shown and described with reference to specific embodiments, however, it should be noted that the invention is in no way limited to the details of the illustrated structures but changes and modifications may be made without departing from the scope of the appended claims.

What is claimed is:

1. A two rotor type piston engine comprising:
  a casing comprised of
    a pair of rotor housings, each rotor housing having an inner wall of of trochoidal configuration,
    an intermediate housing located between the rotor housing, and a pair of side housing secured to outer sides of the respective rotor housing a to define rotor cavities in the respective rotor housings, a pair or substantially polygonal rotors disposed in the respective rotor cavities with apex portions in sliding engagement with the inner walls of the respective rotor housings to define working chambers of cyclically variable volumes, eccentric shaft means carrying said rotors so that said rotors are rotated with 180° phase difference in terms of angle of rotation of said eccentric shaft means, intake means including two first individual intake port means provided in at least one of said intermediate and said side housings and opening to the respective rotor cavities and being cyclically closed by said rotors as the rotors rotate, and two second individual intake port means provided in at least one of said intermediate and said side housings and opening to the respective rotor cavities and being cyclically closed by said rotors as the rotors rotate, changing means for changing port closing timing of the second individual intake port means at a predetermined engine speed range, and intake passage means including throttle valve means, said intake passage means including two first individual passage means leading respectively to said two first individual intake port means, first communicating passage means located downstream of said throttle valve means and communicating with said two first individual passage means, two second individual passage means leading respectively to said two second individual intake port means, said two first individual intake port means, said two first individual passage means and said first communicating passage means having respectively a port timing and an overall length for transmitting a compression wave produced in one of said two first individual passage means in opening timing of said one of said two first individual intake port means to the other of said two first individual intake port means just before said other of said two first individual intake port means is closed to obtain an additional intake charge substantially at said predetermined engine speed range in which the port closing timing of said second individual intake port means is changed by said changing means.

2. A rotary piston engine in accordance with claim 1 in which said second individual intake port means includes main port means and auxiliary port means, said auxiliary port means being being closed later than said main port means, and said changing means includes control valve means for opening the auxiliary port means in said predetermined engine speed range.

3. A rotary piston engine in accordance with claim 2 wherein said auxiliary port means has a port closing timing later than that of the two first individual intake port means, and said rotary piston engine further comprising second communicating passage means communicating with said two second individual passage means, a port timing of said two second individual intake port means and an overall length of said two second individual passage means and said second communicating passage means being determined for transmitting a compression wave produced at one of said two second individual intake port means in opening timing of said one of said two second individual intake port means is transmitted to the other of said two second individual intake port means just before said other of said two second individual port means is closed to obtain an additional intake charge.

4. A rotaty piston engine in accordance with claim 1 in which said two first individual intake port means have an opening period of 230° to 290° in terms of angle of rotation of the eccentric shaft means and the two first individual passage means and said first communicating passage means have an overall length of 0.31 to 1.72 m.

5. A rotary piston engine in accordance with claim 1 in which said two second individual intake port means have a port closing timing later than that of the two first individual intake port means.

6. A two-rotor type rotary piston engine comprising:

a casing comprised of a pair of rotor housings, each rotor housing having an inner wall of trochoidal configuration, an intermediate housing located between the rotor housing, and a pair of side housing secured to outer sides of the respective rotor housing to define rotor cavities in the respective rotor housings, a pair of substantially polygonal rotors disposed in the respective rotor cavities with apex portions in sliding engagement with the inner walls of the respective rotor housings to define working chambers of cyclically variable volumes, eccentric shaft means carrying said rotors so that said rotors are rotated with 180° phase difference in terms of angle of rotation of said eccentric shaft means, intake means including a pair of first intake port means formed in one of said side and said intermediate housings and opening to respective ones of the cavities, a pair of second intake port means formed in the other of said side and said intermediate housings and opening to respective ones of the rotor cavities, first throttle valve means for controlling intake gas flow to said pair of first intake port means and second throttle valve means being opened after the first throttle valve means is substantially opened for controlling intake gas flow to said pair of second intake port means, and said second intake port means including main port means and auxiliary port means, said auxiliary port means being closed later than said main port means, control valve means for opening said auxiliary port means at a predetermined engine speed range, and passage means for connecting said pair of first intake port means having an overall length in relation to port opening and closing timing for transmitting a compression wave produced in one of said pair of first intake port means opening to one rotor cavity to the other of said pair of first intake port means opening to the other rotor cavity just before said other of said pair of first intake port means is closed to obtain an additional intake charge at said predetermined engine speed range at which said control valve means is actuated.

7. A two rotor type piston engine as claimed in claim 1, wherein said predetermined engine speed range is 5000 to 7000 r.p.m.

8. A two rotor type piston engine as claimed in claim 6, wherein said predetermined engine speed range is 5000 to 7000 r.p.m.

* * * * *